US008246397B2

United States Patent
Jacks et al.

(10) Patent No.: US 8,246,397 B2
(45) Date of Patent: *Aug. 21, 2012

(54) INTELLIGENT INTER-CONNECT AND CROSS-CONNECT PATCHING SYSTEM

(75) Inventors: Steven A. Jacks, Villa Park, IL (US); Thomas G. Fuller, Munster, IN (US); Robert J. Pflaum, Cedar Lake, IN (US); Richard A. Rago, New Lenox, IL (US); Brian D. Leshin, Mokena, IL (US); Wayne C. Fite, Emhurst, IL (US); John M. McNally, Chicago, IL (US); Robert Wilcox, Monee, IL (US); Shahriar B. Allen, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,189

(22) Filed: May 9, 2011
(Under 37 CFR 1.47)

(65) Prior Publication Data
US 2011/0244698 A1    Oct. 6, 2011

Related U.S. Application Data

(63) Continuation of application No. 12/389,809, filed on Feb. 20, 2009, now Pat. No. 7,938,700.

(60) Provisional application No. 61/030,405, filed on Feb. 21, 2008.

(51) Int. Cl.
*H01R 9/22*        (2006.01)

(52) U.S. Cl. ......................... 439/941; 439/676; 361/780

(58) Field of Classification Search .................. 439/490, 439/489, 941, 676; 361/780
See application file for complete search history.

(56) References Cited

U.S. PATENT DOCUMENTS

| 3,052,842 | A | 9/1962 | Frohrman et al. |
|---|---|---|---|
| 3,573,789 | A | 4/1971 | Sharp et al. |
| 3,573,792 | A | 4/1971 | Reed |
| 3,914,561 | A | 10/1975 | Schardt et al. |
| 4,018,997 | A | 4/1977 | Hoover et al. |
| 4,072,827 | A | 2/1978 | Orman |
| 4,096,359 | A | 6/1978 | Barsellotti |
| 4,140,885 | A | 2/1979 | Verhagen |
| 4,169,220 | A | 9/1979 | Fields |

(Continued)

FOREIGN PATENT DOCUMENTS
EP          0297079 B1      3/1992
(Continued)

OTHER PUBLICATIONS

"Finding the Missing Link," Cabling Installation & Maintenance, Jun./Jul. 2002.

(Continued)

*Primary Examiner* — Truc T Nguyen
(74) *Attorney, Agent, or Firm* — Christopher S. Clancy; Robert A. McCann; Zachary J. Smolinski

(57) ABSTRACT

An intelligent network patch field management system is provided that includes electronic hardware, firmware, mechanical assemblies, cables, and software that provide visible and audible cues for connecting and disconnecting patch cords in an interconnect or cross-connect patching environment. Systems of the present invention also monitor patch cord connections in a network.

11 Claims, 12 Drawing Sheets

U.S. PATENT DOCUMENTS

| | | | |
|---|---|---|---|
| 4,196,316 A | 4/1980 | McEowen et al. |
| 4,517,619 A | 5/1985 | Uekubo |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |
| 4,890,102 A | 12/1989 | Oliver |
| 4,901,004 A | 2/1990 | King |
| 4,937,529 A | 6/1990 | O'Toole, III et al. |
| 4,937,835 A | 6/1990 | Omura |
| 5,037,167 A | 8/1991 | Beaty |
| 5,081,627 A | 1/1992 | Yu |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,170,327 A | 12/1992 | Burroughs |
| 5,204,929 A | 4/1993 | Machall et al. |
| 5,222,164 A | 6/1993 | Bass, Sr. et al. |
| 5,226,120 A | 7/1993 | Brown et al. |
| 5,233,501 A | 8/1993 | Allen et al. |
| 5,265,187 A | 11/1993 | Morin et al. |
| 5,270,658 A | 12/1993 | Epstein |
| 5,305,405 A | 4/1994 | Emmons et al. |
| 5,353,367 A | 10/1994 | Czosnowski et al. |
| 5,375,028 A | 12/1994 | Fukunaga |
| 5,394,503 A | 2/1995 | Dietz, Jr. et al. |
| 5,432,847 A | 7/1995 | Hill et al. |
| 5,459,478 A | 10/1995 | Bolger et al. |
| 5,463,706 A | 10/1995 | Dumont et al. |
| 5,483,467 A | 1/1996 | Krupka et al. |
| 5,487,666 A | 1/1996 | DiGiovanni |
| 5,521,902 A | 5/1996 | Ferguson |
| 5,532,603 A | 7/1996 | Bottman |
| 5,546,282 A | 8/1996 | Hill et al. |
| 5,550,755 A | 8/1996 | Martin et al. |
| 5,583,874 A | 12/1996 | Smith et al. |
| 5,666,453 A | 9/1997 | Dannenmann |
| 5,684,796 A | 11/1997 | Abidi et al. |
| 5,726,972 A | 3/1998 | Ferguson |
| 5,727,055 A | 3/1998 | Ivie et al. |
| 5,754,112 A | 5/1998 | Novak |
| 5,764,043 A | 6/1998 | Czosnowski et al. |
| 5,790,041 A | 8/1998 | Lee |
| 5,832,071 A | 11/1998 | Voelker |
| 5,847,557 A | 12/1998 | Fincher et al. |
| 5,854,824 A | 12/1998 | Bengal et al. |
| 5,870,626 A | 2/1999 | Lebeau |
| 5,876,240 A | 3/1999 | Derstine et al. |
| 5,878,030 A | 3/1999 | Norris |
| 5,892,756 A | 4/1999 | Murphy |
| 5,898,837 A | 4/1999 | Guttman et al. |
| 5,915,993 A | 6/1999 | Belopolsky et al. |
| 5,923,663 A | 7/1999 | Bontemps et al. |
| 5,944,535 A | 8/1999 | Bullivant et al. |
| 6,002,331 A | 12/1999 | Laor |
| 6,067,014 A | 5/2000 | Wilson |
| 6,078,113 A | 6/2000 | True et al. |
| 6,086,415 A | 7/2000 | Sanchez et al. |
| 6,094,261 A | 7/2000 | Contarino, Jr. |
| 6,168,555 B1 | 1/2001 | Fetterleigh et al. |
| 6,175,865 B1 | 1/2001 | Dove et al. |
| 6,222,908 B1 | 4/2001 | Bartolutti et al. |
| 6,229,538 B1 | 5/2001 | McIntyre et al. |
| 6,234,830 B1 | 5/2001 | Ensz et al. |
| 6,243,510 B1 | 6/2001 | Rauch |
| 6,285,293 B1 | 9/2001 | German et al. |
| 6,330,307 B1 | 12/2001 | Bloch et al. |
| 6,350,148 B1 | 2/2002 | Bartolutti et al. |
| 6,381,283 B1 | 4/2002 | Bhardwaj et al. |
| 6,421,322 B1 | 7/2002 | Koziy et al. |
| 6,424,710 B1 | 7/2002 | Bartolutti et al. |
| 6,434,716 B1 | 8/2002 | Johnson et al. |
| 6,437,894 B1 | 8/2002 | Gilbert et al. |
| 6,453,014 B1 | 9/2002 | Jacobson et al. |
| 6,456,768 B1 | 9/2002 | Boncek et al. |
| 6,499,861 B1 | 12/2002 | German et al. |
| 6,522,737 B1 | 2/2003 | Bartolutti et al. |
| 6,543,941 B1 | 4/2003 | Lampert |
| 6,561,827 B2 | 5/2003 | Frostrom et al. |
| 6,574,586 B1 | 6/2003 | David et al. |
| 6,577,243 B1 | 6/2003 | Dannenmann et al. |
| 6,588,938 B1 | 7/2003 | Lampert et al. |
| 6,601,097 B1 | 7/2003 | Cheston et al. |
| 6,626,697 B1 | 9/2003 | Martin et al. |
| 6,629,269 B1 | 9/2003 | Kahkoska |
| 6,684,179 B1 | 1/2004 | David |
| 6,688,910 B1 | 2/2004 | Macauley |
| 6,714,698 B2 | 3/2004 | Pfeiffer et al. |
| 6,725,177 B2 | 4/2004 | David et al. |
| 6,750,643 B2 | 6/2004 | Hwang et al. |
| 6,778,911 B2 | 8/2004 | Opsal et al. |
| 6,784,802 B1 | 8/2004 | Stabescu |
| 6,798,944 B2 | 9/2004 | Pfeiffer et al. |
| 6,802,735 B2 | 10/2004 | Pepe et al. |
| 6,817,890 B1 | 11/2004 | Schindler |
| 6,823,063 B2 | 11/2004 | Mendoza |
| 6,857,897 B2 * | 2/2005 | Conn ............................ 439/490 |
| 6,871,156 B2 | 3/2005 | Wallace et al. |
| 6,894,480 B2 | 5/2005 | Back |
| 6,898,368 B2 | 5/2005 | Colombo et al. |
| 6,905,363 B2 | 6/2005 | Musolf et al. |
| 6,906,505 B2 | 6/2005 | Brunet et al. |
| 6,975,242 B2 | 12/2005 | Dannenmann et al. |
| 6,992,491 B1 | 1/2006 | Lo et al. |
| 7,005,861 B1 | 2/2006 | Lo et al. |
| 7,027,704 B2 | 4/2006 | Frohlich et al. |
| 7,028,087 B2 | 4/2006 | Caveney |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,068,043 B1 | 6/2006 | Lo et al. |
| 7,068,044 B1 | 6/2006 | Lo et al. |
| 7,160,143 B2 | 1/2007 | David et al. |
| 7,207,846 B2 | 4/2007 | Caveney et al. |
| 7,217,152 B1 | 5/2007 | Xin et al. |
| 7,234,944 B2 | 6/2007 | Nordin et al. |
| 2002/0069277 A1 | 6/2002 | Caveney |
| 2002/0071394 A1 | 6/2002 | Kozly et al. |
| 2002/0090858 A1 | 7/2002 | Caveney |
| 2002/0116485 A1 | 8/2002 | Black et al. |
| 2003/0061393 A1 | 3/2003 | Steegmans et al. |
| 2003/0073343 A1 | 4/2003 | Belesimo |
| 2003/0152087 A1 | 8/2003 | Shahoumian et al. |
| 2004/0044599 A1 | 3/2004 | Kepner et al. |
| 2004/0052471 A1 | 3/2004 | Colombo et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0219827 A1 | 11/2004 | David et al. |
| 2005/0052174 A1 | 3/2005 | Angelo et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0186819 A1 | 8/2005 | Velleca et al. |
| 2005/0195584 A1 | 9/2005 | AbuGhazeleh et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |
| 2006/0057876 A1 | 3/2006 | Dannenmann et al. |
| 2006/0282529 A1 | 12/2006 | Nordin et al. |
| 2007/0032124 A1 | 2/2007 | Nordin et al. |
| 2007/0132503 A1 | 6/2007 | Nordin |

FOREIGN PATENT DOCUMENTS

| | | |
|---|---|---|
| EP | 0575100 B1 | 12/1993 |
| EP | 0745229 B1 | 3/2003 |
| EP | 1788825 A2 | 5/2007 |
| FR | 2680067 A1 | 2/1993 |
| GB | 2236398 A | 4/1991 |
| GB | 2347751 A | 9/2000 |
| GB | 2347752 A | 9/2000 |
| JP | 676878 | 3/1994 |
| JP | 2004349184 | 12/2004 |
| WO | 9926426 A1 | 5/1999 |

| | | | |
|---|---|---|---|
| WO | 0060475 A1 | 10/2000 | |
| WO | 0155854 A1 | 8/2001 | |
| WO | 2004044599 A2 | 3/2004 | |
| WO | 2005072156 A2 | 8/2005 | |
| WO | 2006052686 A1 | 5/2006 | |

OTHER PUBLICATIONS

"IntelliMAC—The New Intelligent Cable Management Solution by ITRACS & NORDX/CDT," Press Release, 2003.

"RIT Technologies, Ltd., SMART Cabling System," RIT Technologies, Ltd., 2004.

"Ortronics Launches iTRACS—Ready Structured Cabling Solutions," New Release, Mar. 7, 2003.

"The SYSTIMAX iPatch System—Intelligent yet simple patching...," CommScope, Inc., 2004.

"White Paper—Intellifent Patching," David Wilson, Nov. 2002.

"PatchView for the Enterprise (PV4E) technical background/Networks for Business," Jun. 24-26, 2003.

"RiT Technologies, Ltd. Go Patch-less," May 2000 edition of Cabling Systems.

"Intelligent Cable Management Systems—Hot Topics," Trescray, printed Oct. 20, 2004.

"Brand-Rex Network Solutions Access Racks Cat 5E6 Cabling UK," Printed Oct. 20, 2004.

"Molex Premise Networks/Western Europe-Real Time Patching System", Molex Prem. Networks, 2001.

"Product of the Week—Molex's Real Time Patching System," Printed Oct. 13, 2004.

"EC&M Taking Note of Patch Panel Technology," Mark McElroy, Jun. 1, 1998.

* cited by examiner

Cross-Connect Architecture

Inter-Connect Architecture

INTELLIGENT INTER-CONNECT AND CROSS-CONNECT PATCHING SYSTEM

CROSS-REFERENCE

This application is a continuation of U.S. patent application Ser. No. 12/389,809, filed Feb. 20, 2009, now U.S. Pat. No. 7,938,700, which claims priority to U.S. Provisional Patent Application No. 61/030,405, filed Feb. 21, 2008, the subject matter of which is hereby incorporated herein by reference in its entirety. Further, U.S. Pat. No. 7,297,018, issued Nov. 20, 2007 is incorporated herein by reference in its entirety.

TECHNICAL FIELD

The present application relates to network documentation and revision systems, and more particularly to a system for implementing an intelligent interconnect and cross-connect patching system between end users and network switches.

BACKGROUND

Communications networks are growing in number and complexity, and are continually being interconnected to satisfy customers' needs. Patch panels are used in communications networks as intermediate elements between horizontal cabling (to which endpoint devices such as computers and telephones are connected) and network switches. Specifically, patch panels include a panel of network ports that connect incoming and outgoing lines of a local area network (LAN) or other communication, electronic or electrical system. In a LAN, for example, the patch panel connects the network's computers to switches or routers that enable the LAN to connect to the Internet or another wide area network (WAN). Connections are made with patch cords. The patch panel allows circuits to be arranged and rearranged by plugging and unplugging the patch cords.

When physical connections between endpoint devices and network switches are added, moved or removed, patch panels are the points at which technicians complete the required moves, additions or changes of cabling within patch fields. Patch panels offer the convenience of allowing technicians to quickly change the path of selected signals, without the expense of dedicated switching equipment.

It is important to maintain a record of changes that are made to patch cord connections within the patch field. Proper documentation of changes in the patch field assures that the routing of patch cords is always known and further assures that any future changes are completed correctly.

Human error associated with the implementation and maintenance of physical cable connections between network communication equipment can result in significant negative impact to a network. Such negative impact can be avoided through improved control and verification of network cable Move/Add/Change orders implemented by network technicians.

SUMMARY

Within embodiments discussed below, a system for guiding patch cord connections in a network is provided. The system includes a patch panel including ports, a panel management module (PMM) inserted into the patch panel and being able to detect insertion or removal of a patch cord into a port of the patch panel, and a peripheral expansion management module (PEMM) coupled to the PMM for providing support to the PMM.

The system may be used to provide for a method of guiding patch cord connections in a cross-connect network so as to detect insertion or removal of a patch cord into a port of the patch panel. The method includes receiving a nine-wire patch cord into a patch panel port, determining a type of cable that has been received, and determining whether a far end of the nine-wire patch cord is plugged into a patch panel. The method also includes initiating communications and exchanging data via a ninth wire of the nine-wire patch cord when both ends of the nine-wire patch cord are inserted into patch panel ports, and communicating connection status to the PMM.

The system may be used to provide for a method of guiding patch cord connections in an interconnect network so as to detect insertion or removal of a patch cord into a port of the patch panel. The method includes receiving a close end of a ten-wire patch cord into a provisioning port of the PMM, the PMM instructing a far end of the ten-wire patch cord to illuminate an LED at the far end, and receiving the far end of the ten-wire patch cord into a port of the switch or router. The method also includes the PMM receiving a packet from the switch that indicates a port address at which the far end of the ten-wire patch cord has been inserted, and determining if the far end of the ten-wire patch cord has been inserted into a correct port of the switch. If the far end of the ten-wire patch cord has been inserted into a correct port of the switch, the method includes the PMM illuminating an LED atop the provisioning port to instruct a user to remove the close end of the I-Cord from the provisioning port on the PMM. Following this, the method includes receiving the close end of the I-Cord into a port of the patch panel and determining if the close end of the I-Cord has been inserted into a correct patch panel port.

In still other embodiments, a port trace key may be used with the system to provide a method of guiding patch cord tracing in a network. The method includes receiving a port trace key into a provisioning port of the PMM and the PMM reading a memory of the port trace key to identify an LED color sequence to use for tracing ends of a patch cord. Following, the method includes receiving a first end of a patch cord into the provisioning port of the PMM, instructing a second end of the patch cord to illuminate an LED according to the LED color sequence received from the port trace key, and storing changes made to the system in the memory of the port trace key.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

DETAILED DESCRIPTION

The present application provides a system including an Intelligent Physical Layer Management (IPLM) tool with modular, intelligence-ready patch panels, panel management modules, enhanced patch cords, and software that enables operations and management aspects for the system. The system enables complete tracing of cables in patch panel connections within cross-connect patch panel architectures.

I. Patch-Field System Architecture Overview

Figure 1:
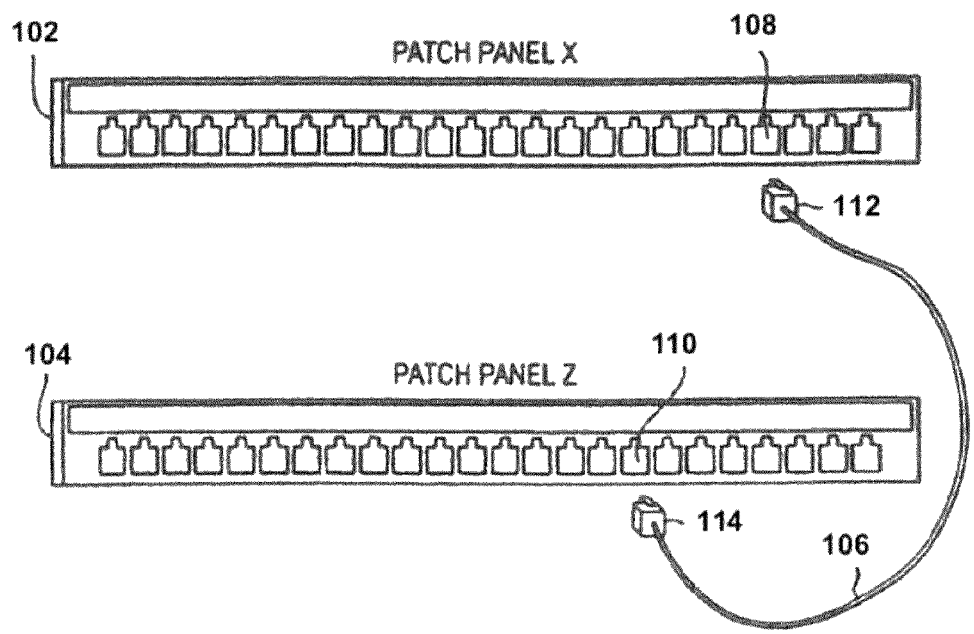
FIG. 1 illustrates an example patch panel system.

FIG. 1 illustrates an example patch panel system including patch panel 102 (labeled "Patch Panel X") connected to patch panel 104 (labeled "Patch Panel Z") using a patch cord 106. Ports of the patch panels 102 and 104, such as ports 108 and 110, may communicate connection information between each other via the patch cord. Patch panels of the present application may be available in both flat and angled configurations. The patch panels 102 and 104 and/or the patch cord 106 may be provided with "intelligence" in the form of circuitry, which can perform detailed functions (discussed below).

Figure 2:
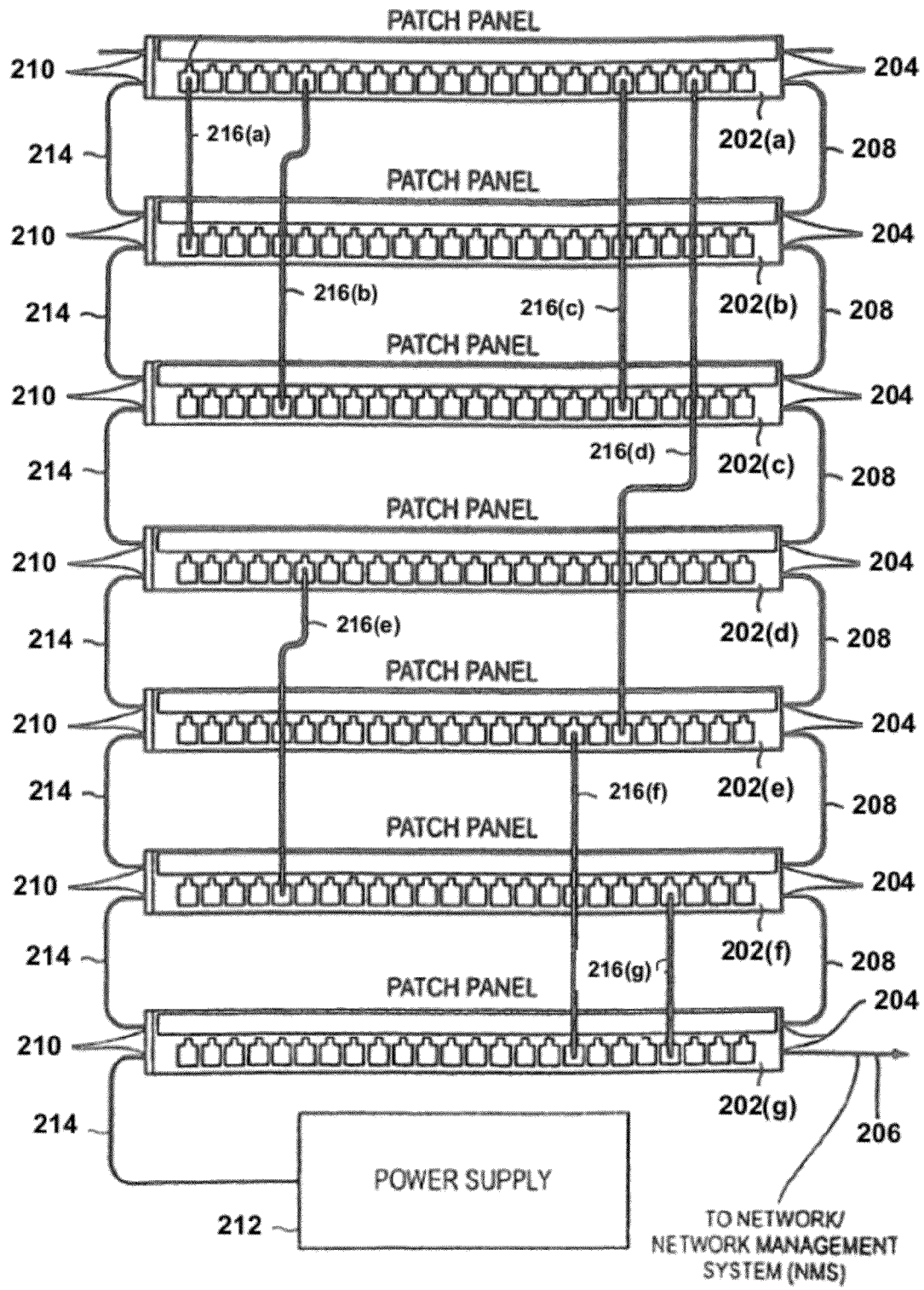
FIG. 2 illustrates an example of seven modular patch panels.

FIG. 2 illustrates an example of seven modular patch panels 202(a)-(g). Each patch panel 202 includes a pair of network connection ports 204 that allow the respective patch panels to be connected in a daisy-chain configuration to a network connection 206 using daisy-chain network cables 208 (e.g., relatively short spans of 4-pair network cable terminated in conventional RJ-45 terminators). The network connection 206 may provide network connectivity to each patch panel in the daisy-chain and may provide each patch panel in the daisy-chain with connectivity to a remote network management system (NMS). Further, each patch panel 202 may include a pair of power sharing ports 210 that allow the patch panels to be interconnected in a daisy-chain configuration to a single power supply 212 using daisy-chain power cables 214 (e.g., relatively short spans of DC or AC electrical power cabling with appropriate connectors). Data connections between ports of the patch panels 202, shown in a cross-connect deployment, are made by patch cords 216(a)-(g).

Patch panels may be connected in a variety of ways, and the above configurations are just two such examples. Depending on an amount of customers to support, additional patch panels may also be included.

Each patch panel port of the present application is provided with contacts that enable the patch panels to identify when patch cord plugs have been inserted into ports of the patch panel. Further, each patch panel port is provided with indicator lights (or other signaling mechanisms) that allow the patch panels to guide steps of the addition or removal of patch cords connected between patch panels. The indicator lights may be implemented as dual-color red and green LEDs, for example. The use of contacts enables guided addition and removal processes, instant recognition of plug insertions and removals by the patch panels, and immediate communication of plug insertions and removals by patch panels to a network management system (NMS), which may be a software application that runs on a Windows or Linux operating system, for example. The NMS allows clients to connect and perform a multitude of actions including, but not limited to, creation of work orders and creation of equipment specific or location specific policies, tasks, etc. The NMS may communicate with the patch panel via SNMP over standard 10/100 Ethernet. One example of management software is described in United States Patent Application Publication No. US 2006/0047800 A1, the contents of which are incorporated by reference as if fully set forth herein.

The patch panels may thus be considered "intelligent" patch panels because the patch panels can detect the insertion or removal of patch cords. The patch panels may be a shielded or UTP (unshielded twisted pair) patch panel. Patch panels may accommodate copper or fiber jacks, and are available in straight or angled variants. The patch panels include two detachable wing boards that house electronic circuitry, such as integrated light-emitting diodes (LEDs), proprietary two-conductor plug receptacles (for example, one each per jack located adjacent to the jack) and other electronic components necessary to enable continuous scanning of patch cord connections and visual cueing to an operator or technician.

Figure 3:
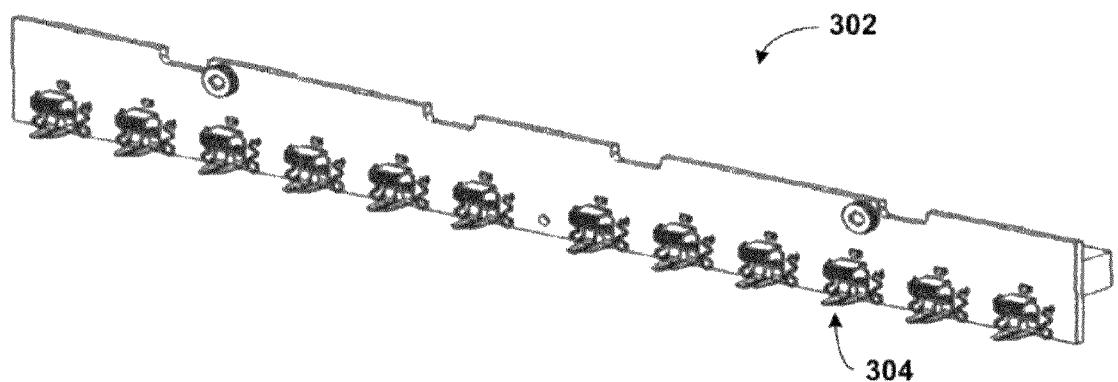
FIG. 3 illustrates one example of a front perspective view of a wing board.

FIG. 3 illustrates one example of a front view of a wing board 302. The wing board is preferably a printed circuit board assembly that includes microcontrollers, LEDs, and contacts, such as contact 304, which are attached to or assembled to the patch panels. The contacts are inserted into each port opening of a patch panel, and receive contacts of patch cords, for example. Wing boards may be attached to the left and right side of a patch panel. The wing boards are electrical/mechanical assemblies that provide the mechanical and electrical interfaces to patch cords as well as low-level communications hardware for data transfer between patch panels (in XCP (cross-connect patching) configurations) or between patch panels and interconnect plug electronics (in ICP (interconnect patching) configurations). The wing boards may be of many designs, such as a power over Ethernet (PoE) wing board, a visual display wing board (such as a wing board with an LCD display), a variant wing board (such as a wingboard having environmental sensors such as temperature or moisture sensors) and/or combinations of the above.

Ports of the patch panel may include contacts that support communication via patch cords that have eight wires. In the present application, an intelligent patch cord may be a 10-wire patch cord, including the eight typical wires and two additional wires, referred to herein as the 9th and 10th wires, which will contact with 9th and 10th wire contacts in the wing boards. In some embodiments, a 9-wire patch cord is provided, including the eight typical wires and one additional wire, which contacts a $9^{th}$ wire contact provided in the wing boards. Ninth (and tenth) wires and contacts according to the present invention are used for patch cord management functions and may be considered "management contacts" or "management wires."

The patch panel system of the present application also includes a panel management module (PMM). The PMM is a modular (i.e., readily installed or removed) microprocessor assembly that provides intelligence and network connectivity to the patch panel. The PMM includes a printed circuit board, a cold fire processor complex (CFP) including flash and RAM memory and a clock, and a peripheral equipment microcontroller (PEPIC) sub-assembly, for example. The PMM enables efficient servicing, whereby a replacement PMM can be inserted and provisioned quickly to minimize downtime of the patch panel. The PMM provides "intelligence" to the patch panel, and thus using a modular piece enables upgrading processor technology without requiring an entire patch panel to be exchanged.

Figure 4A:
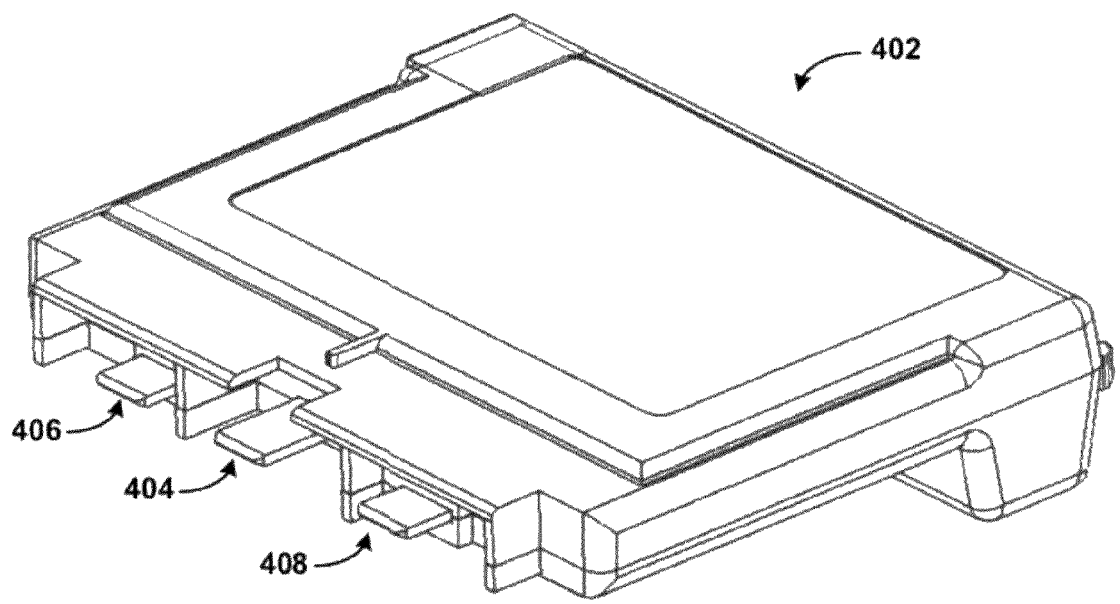
FIGS. 4A-4B illustrate examples of a front and rear perspective view of a panel management module (PMM).
Figure 4B:
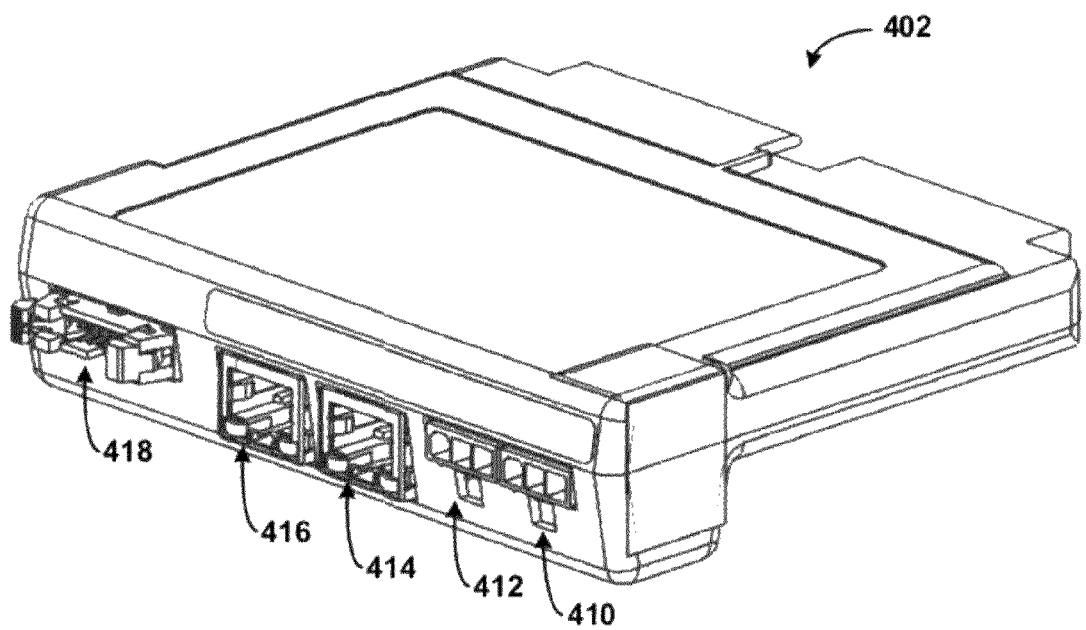

FIG. 4A illustrates one example of a front view of a PMM 402, and FIG. 4B illustrates one example of a rear view of the PMM 402. The PMM 402 preferably includes three card edge connectors 404, 406, and 408 that connect with the patch panel. The patch panel accepts the PMM in a center of the patch panel. The connector 404 mates with a provisioning port (or user interface area) of the patch panel, while connectors 406 and 408 mate with right and left wing boards of the patch panel. On the rear of the PMM 402 are two power ports 410 and 412, which allow for a daisy-chain power connection. The power ports 410 and 412 may be 48-volt DC power connectors, and the PMM 402 can use either connector to receive power, with the other available to pass power to another PMM or other module.

In the center of the rear of the PMM 402 are two Ethernet ports 414 and 416, such as Ethernet ports for connecting to an Ethernet network and for daisy chaining Ethernet connectivity between PMMs (via a cat5e Ethernet cable, for example). The PMM also includes an RS-485 data port 418 that may be used for connecting to other expansion devices (such as a peripheral expansion management module (PEMM) discussed below).

Figure 5A:
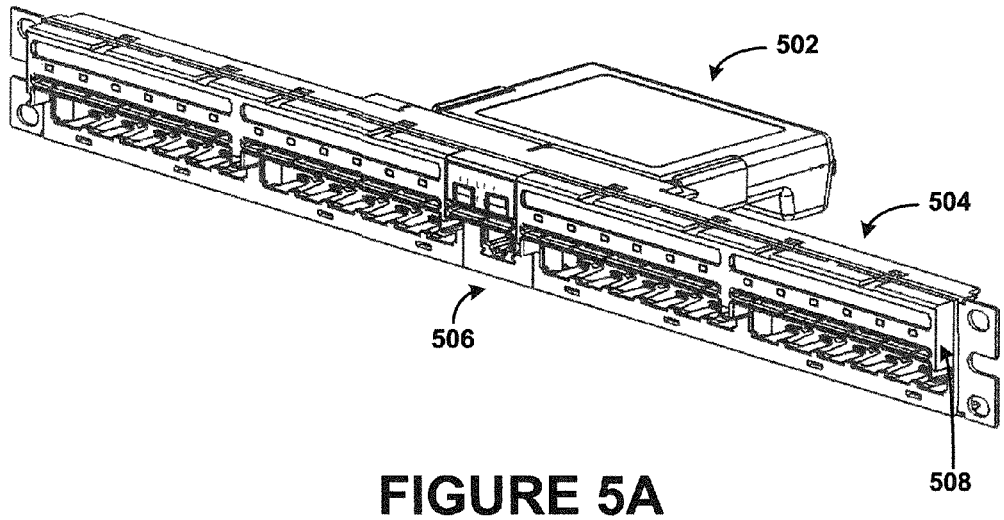
FIGS. 5A-5B illustrate examples of a front and rear perspective view of a panel management module (PMM) installed within a patch panel.
Figure 5B:
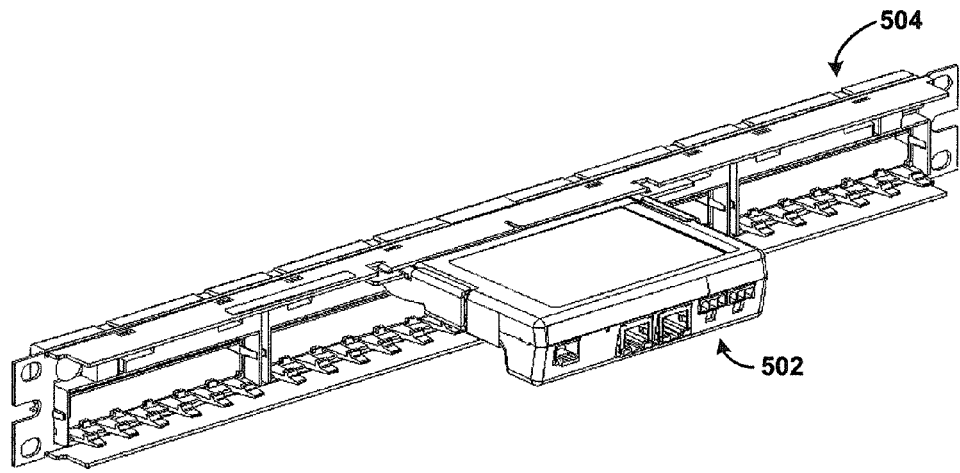

FIG. 5A illustrates one example of a front view of a PMM 502 installed within a patch panel 504. FIG. 5B illustrates one example of a rear view of a PMM 502 installed within a patch panel 504.

The PMM 502 provides a processor core for managed network solution products and application-specific wing boards. Firmware within the PMM 502 provides the PMM 502 with software required to support different types of wing boards. The wing boards, such as wing board 508, may include discrete components, program array logic (PAL) devices, PIC microcontrollers, or microprocessors, and the PMM 502 may communicate with any of these devices.

Figure 6A:
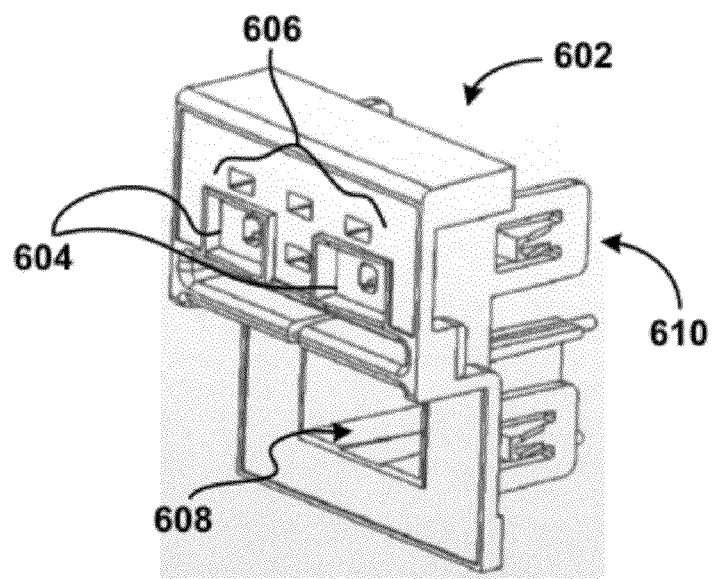
FIGS. 6A illustrates an example of a user interface.

The patch panels of the present application also include a provisioning port 506 (shown in FIG. 5A). The provisioning port 506 provides user access to a technician at a rack with an installed PMM. The provisioning port provides a subset of the management capabilities provided by the rear-facing ports. FIG. 6A illustrates one example of a front view of a user interface insert 602 that is mounted at the provisioning port. The user interface insert 602 includes two buttons 604, four LED's 606, the provisioning port 506 (shown in FIG. 6A as an RJ45 Ethernet jack 608), and contacts to detect a 9th and 10th wire of a patch cord (not visible due to perspective). The user interface insert 602 interfaces with the PMM through a card edge connector 610.

Figure 6B:
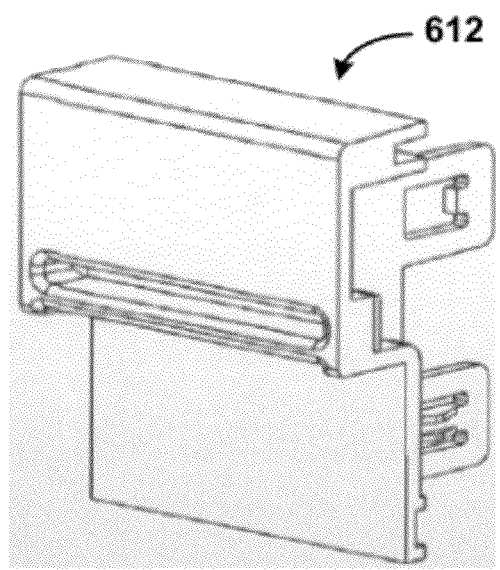
FIG. 6B illustrates an example a plastic insert to the patch panel.

If a patch panel does not include a PMM, a plastic insert 612 as shown in FIG. 6B may be inserted into the provisioning port of the patch panel.

Figure 7:
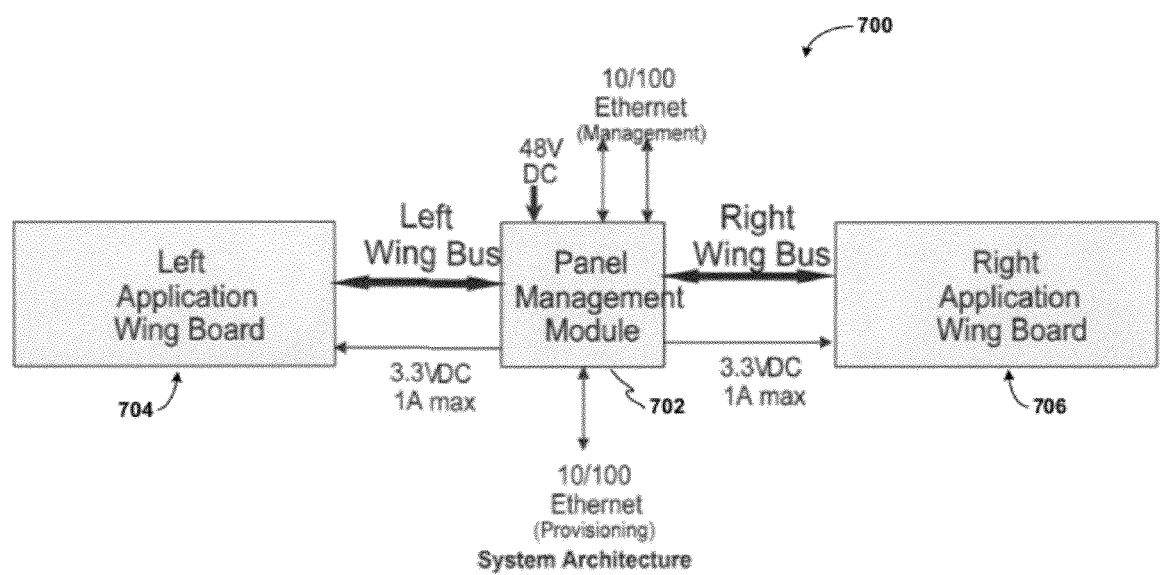
FIG. 7 illustrates an example block diagram of a patch panel system architecture.

FIG. 7 illustrates an example block diagram of a patch panel system architecture 700. The system 700 includes a PMM 702 interfacing with two wing boards 704 and 706 through two separate wing-buses: a left wing bus and a right wing bus. The PMM 702 is shown to provide up to one amp of 3.3 volt DC power to each wing board 704 and 706. Future wing boards requiring more than one amp may be required to have a separate or additional power source. The PMM 702 is shown to include a power input (48 volt DC), two Ethernet ports (10/100 ports) (which may be provided on a rear face) and a single Ethernet port on a front of the PMM 702 for a provisioning port located on the front of the patch panel.

Figure 8:
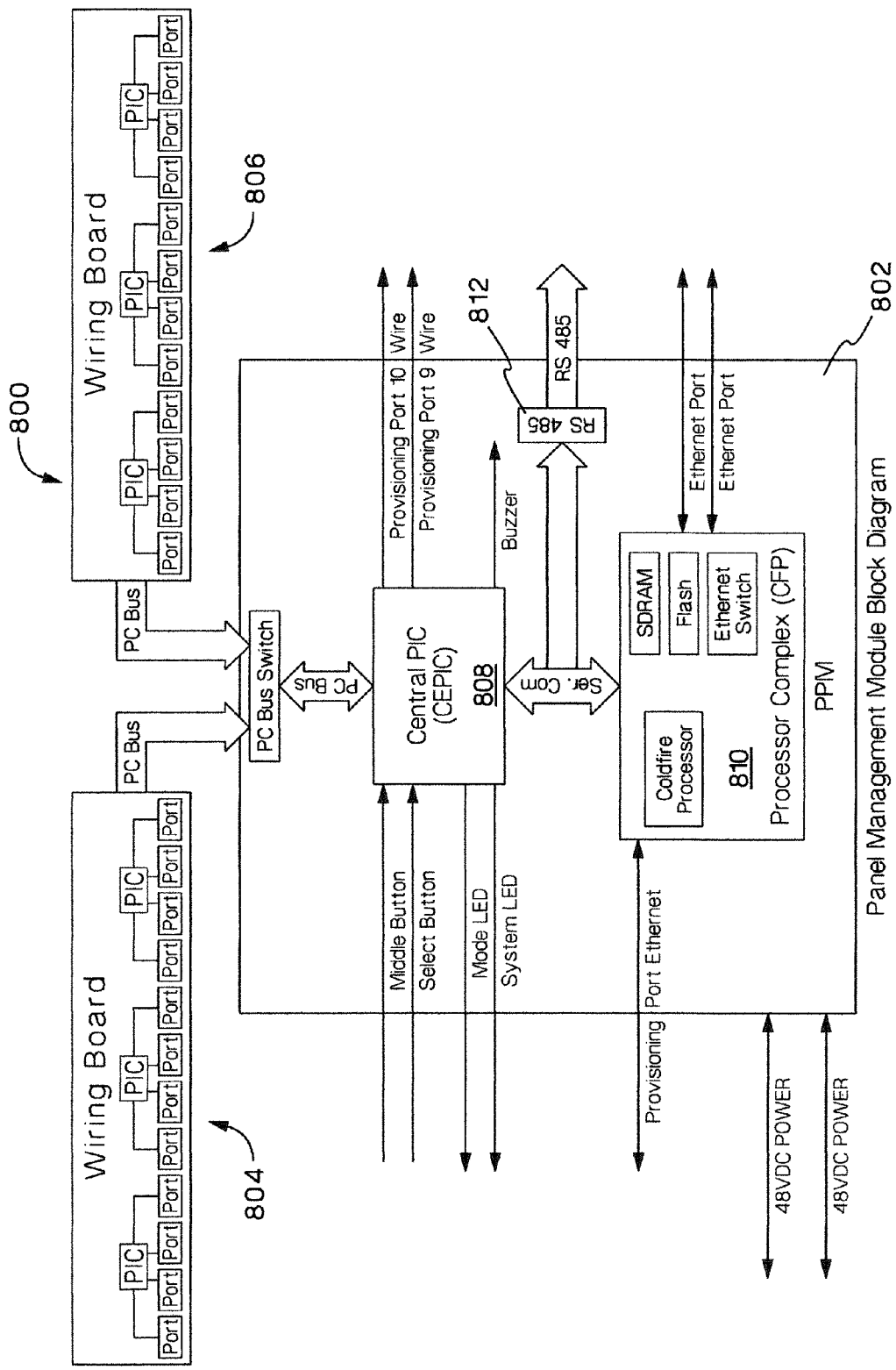
FIG. 8 illustrates a more detailed example block diagram of a patch panel system architecture.

FIG. 8 illustrates a more detailed example block diagram of a patch panel system architecture 800. As mentioned above, the system 800 includes a PMM 802 connected to two wing boards 804 and 806 through separate PC buses. Each of the wing boards includes multiple ports grouped together and possibly managed by multiple processors. The PMM 802 includes a central PIC processor 808 that communicates with the provisioning port of the patch panel, and with a 9th and 10th wire of a patch cord. The processor 808 interfaces with a processor complex 810, such as a ColdFire processor complex (CFP), that is capable of running with a 32-bit data bus and a 24-bit address bus. In one embodiment, the processor complex 810 includes flash memory, that may be limited to a 16-bit data bus, an Ethernet Switch that contains five Ethernet Physical Layer Interfaces (PHYs) and a Media Independent Interface (MII) to the ColdFire processor in the CFP complex 810, and SDRAM memory. The FLASH memory device will support boot code, application code, and non-volatile databases. The SDRAM memory device will support boot code, application code, and volatile data.

The PMM 802 also includes an RS485 expansion port 812 to connect to and manage future in-rack devices, such as thermal monitoring, environmental control, and power monitoring.

User interactions with the functions enabled by the PMM 802 may be carried out via a user interface with two pushbuttons that are used for various user controls including port selection, PMM reset, user confirmations, etc. The provisioning port is also present on the PMM user interface along with four tri-color LED's. The PMM 802 may also include a buzzer to be used to further guide a technician in provisioning of patch cords.

Figure 9:
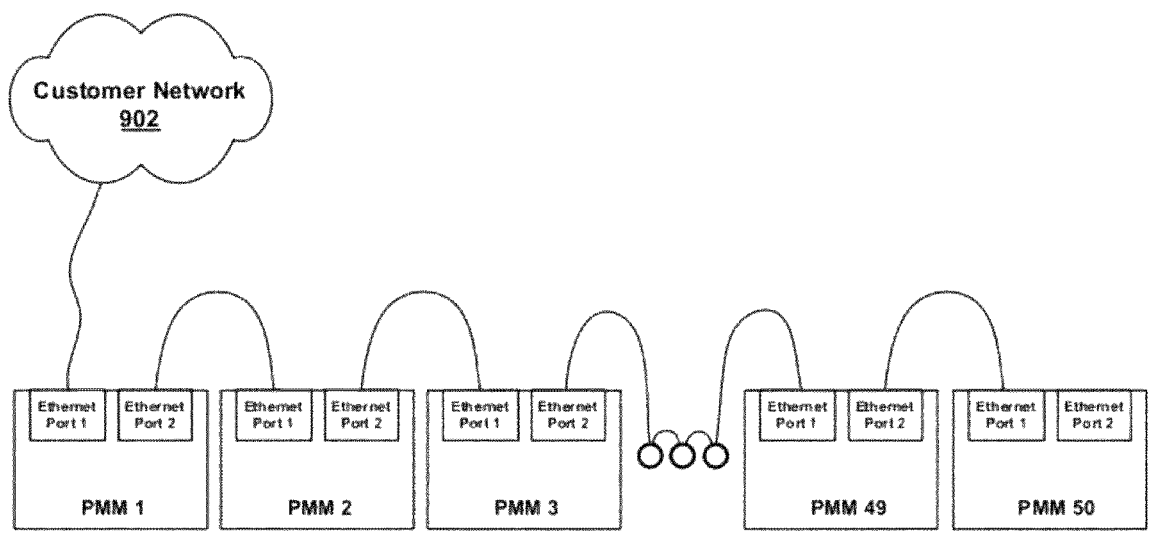
FIG. 9 illustrates a block diagram of an example of a panel management module (PMM) daisy chain configuration.

FIG. 9 illustrates a block diagram of an example of a PMM daisy chain configuration. The patch panel system according to one embodiment of the present application may support up to 50 units in a daisy chain of the Ethernet links. As shown, a first PMM is connected to a network 902 through Ethernet port 1. A second PMM connects to Ethernet port 2 of the first PMM. This connection configuration continues through to a fiftieth PMM, for example (a configuration may include more or fewer PMMs). The daisy chain capability eliminates the need for additional Ethernet switch ports as the number of PMMs increases. The daisy chain will also support a proprietary messaging interface between units within the daisy chain. Firmware in the PMM allows a user to configure a PMM by directly connecting to a rear of the PMM. Moreover, the user can configure or reconfigure all of the PMM's in a chain by connecting to one PMM. For example, a user could plug a computer into the tenth PMM and manage all PMMs through a web-based or command-line interface.

Figure 10:
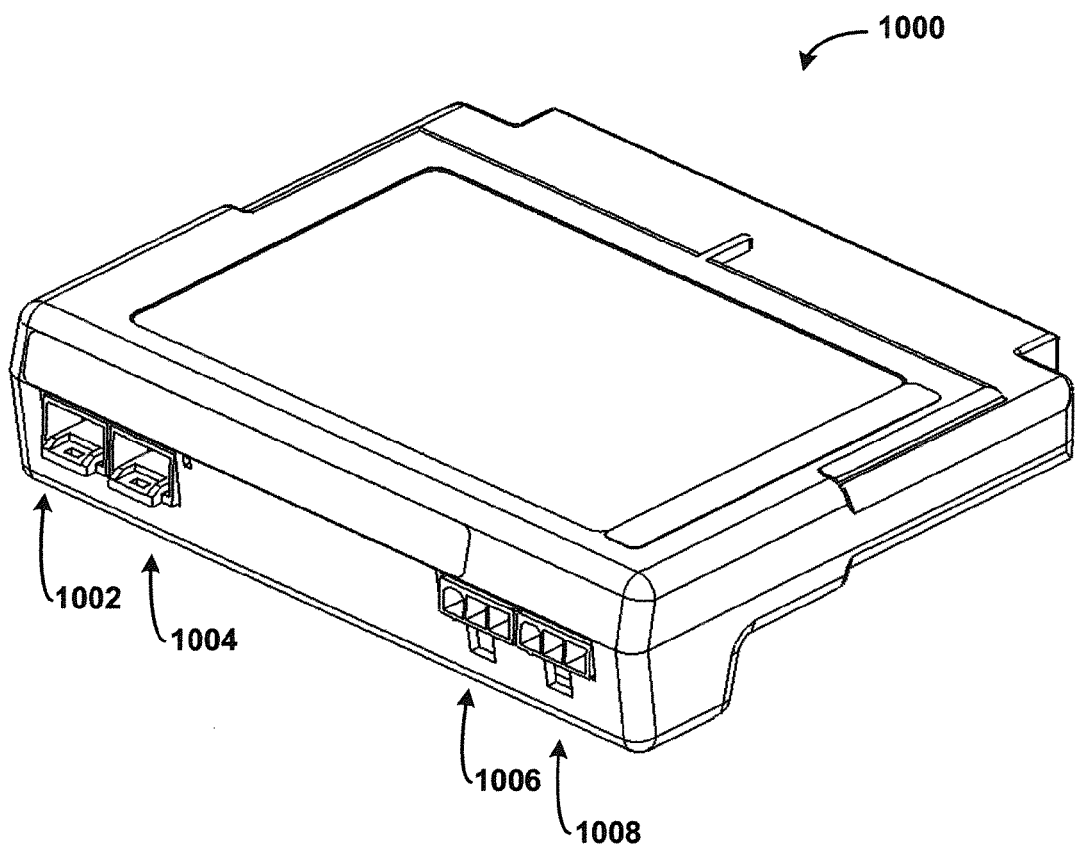
FIG. 10 illustrates an example of a rear perspective view of a peripheral expansion management module (PEMM).

The patch panel system of the present application may also include a peripheral expansion management module (PEMM). FIG. 10 illustrates an example of a rear view of a PEMM 1000. The PEMM 1000 is a peripheral device that attaches to a PMM through an RS485 port and is an extension of the PMM, bringing some functions of the PMM to other panels (for example, other panels within a rack) without necessarily replicating all of the connectivity or user interface elements of the PMM. Thus, the PEMM 1000 includes two RS485 ports 1002 and 1004. The PEMM 1000 also includes two power connectors 1006 and 1008, one of which is used to power the PEMM 1000 and the other of which can be used to daisy-chain power connections to other expansion devices. The PEMM 1000 may include the same microcontroller as found in a PMM, and functions as an extension of the PMM. In one embodiment, the PEMM 1000 acts as an expansion device for the PMM on a separate panel from the PMM, and may be similar to the PMM except that the PEMM does not include Ethernet ports and cannot directly connect to the network. The PEMM 1000 may transmit control signals from the PMM to control contacts and indicator lights associated with ports of the patch panel to which the PEMM 1000 is connected. Alternatively, the PMM may transmit instructions to the PEMM, which in turn can directly address the indicator lights on its associated patch panel, as well as transmit and receive signals to and from control contacts associated with ports on the patch panel where the PEMM is installed. Other types of connectivity may be provided on the PEMM, depending on the particular functions desired by the user.

In another embodiment, patch panel connections (e.g., connections between patch panels) of the present application may be made using a nine-wire patch cord, which differs from a typical patch cord in that the nine-wire patch cord includes an extra wire that allows for sensing of connection and communication across the physical layer. A nine-wire patch cord may be a standard RJ45-style Ethernet patch cord with an additional conductor attached to a blade assembly at each plug.

Patch panel connections (e.g., connections between patch panels) of the present application may be made using an interconnect patch cord (a ten-wire patch cord) that supports Intelligent Physical Layer Management (IPLM) of networks. A ten-wire patch cord has the availability as both an unshielded and shielded solution, availability in varying lengths and colors, and integration of a contact system to enable continuous patch-field scanning. The ten-wire patch cord has an additional wire that allows for communication to and from circuitry embedded in the cable and the RJ45 jack. The ten-wire patch cord includes circuitry to provide unique patch cord identification and jack identification, and an embedded LED for patch guidance for cueing the operator of an operation. In order to detect connectivity changes, a design of the I-Cord provides continuous-scanning capabilities of the interconnect solution without requiring the addition of sensor strips, mechanical contacts or any such hardware onto the switch.

Figure 11:
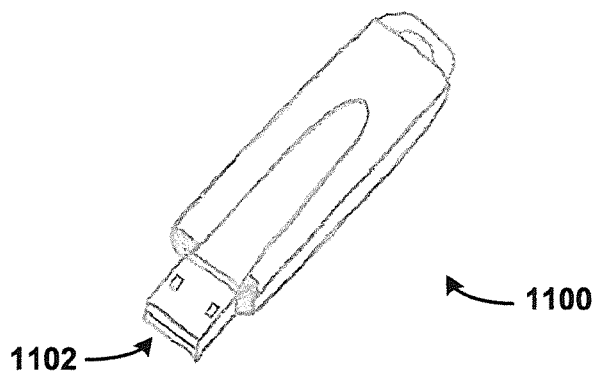
FIG. 11 illustrates an example of a port trace key (PTK).

The patch panel system of the present application may also include a Port Trace Key (PTK) 1100, an example of which is illustrated in FIG. 11. The PTK 1100 includes a memory to store a unique identifier to be used to establish a sequence of colors of an LED to use for tracing ends of a cable (e.g., a sequence of colors associated with a specific key), and for storing the changes made to the system including who made the changes. The PTK 1100 includes an RJ45 connector 1102 with 9th and 10th wire contacts and a printed circuit board (PCB) with intelligence to store the unique ID. For a user to gain access to port trace functionality of the PMM, a user first inserts the PTK 1100 into the PMM provisioning port. The trace functionality allows the user to trace the two ports to which a patch cord is connected by illuminating the LED(s) above the respective ports by flashing a pattern associated with the PTK.

The PTK 1100 is useful when, for example, a technician needs to perform a trace or troubleshoot a port. Upon insertion of the PTK 1100 into a PMM, the PMM transitions to a trace mode and reads the PTK's unique identifier to determine a color sequence to use. The technician will then use the buttons on the PMM to select the port that he wishes to trace. The LED above that port will then display the LED sequence as designated by the PTK above both of the ports that the patch cord is connected to, thus allowing the technician to identify both ends. The technician can then make a visual determination at the far end of the cable to identify the cable that has an LED blinking according to the PTK's color sequence (e.g., red/green). Additionally, a virtual trace can be instituted using the NMS without a technician being present or without a trace key being present at the patch panel.

The PTK enables multiple users to initiate multiple simultaneous traces due to tri-color LED's above each port in the patch panel that can be used to differentiate the state and type of cord connected to each port. Additionally, because each port trace key has a unique identifier, the system can store patch cord connectivity changes made by a user using the port trace key and/or the changes can be stored within the memory of the port trace key. Further, each technician can be assigned a specific port trace key so that an administrator can determine who made changes to the system.

II. Patch-Field System Operation

The patch panel system of the present application is an Intelligent Physical Layer Management (IPLM) tool including modular, intelligence-ready patch panels, PMMs, enhanced patch cords, and software that enables operations and management functions of the system to be performed more easily. Aspects of the present application enable a technician to perform patching between patch panels more efficiently. A sequence of steps is provided below to create a connection between a patch panel and a switch using the patch panel system of the present application.

The PMM that is inserted into the patch panel will act as the primary intelligence in the system to maintain connection status information and to aid the technician with cord tracing and patching.

Figure 12A:
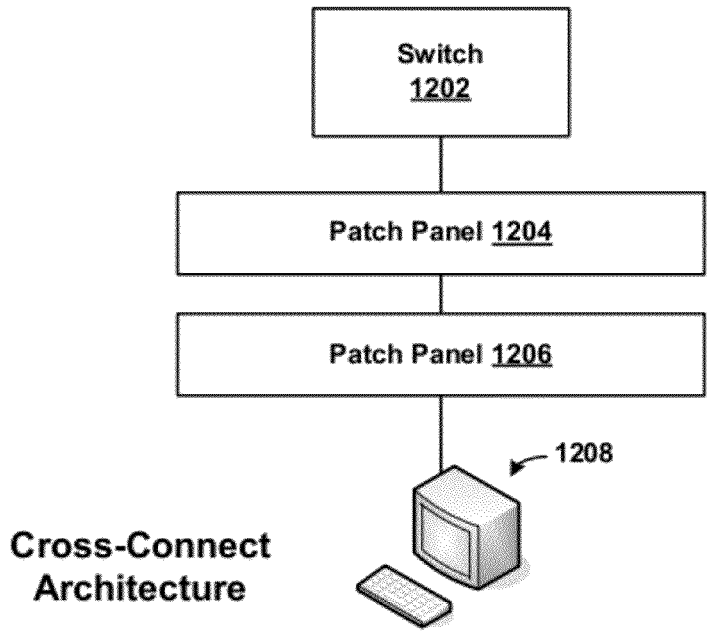
FIG. 12A is an example block diagram illustrating a cross-connect network architecture.

Patch panel systems of the present application may be used within a cross-connect or interconnect type architecture. FIG. 12A is an example block diagram illustrating a cross-connect architecture, which is a configuration including a switch 1202 coupled to an end computer 1208 through a panel 1204 to panel 1206 connection. For purposes of the present description, the panels 1204 and 1206 are provided with "intelligence" in the form of circuitry, such as by including PMMs and wing boards for example.

Figure 12B:
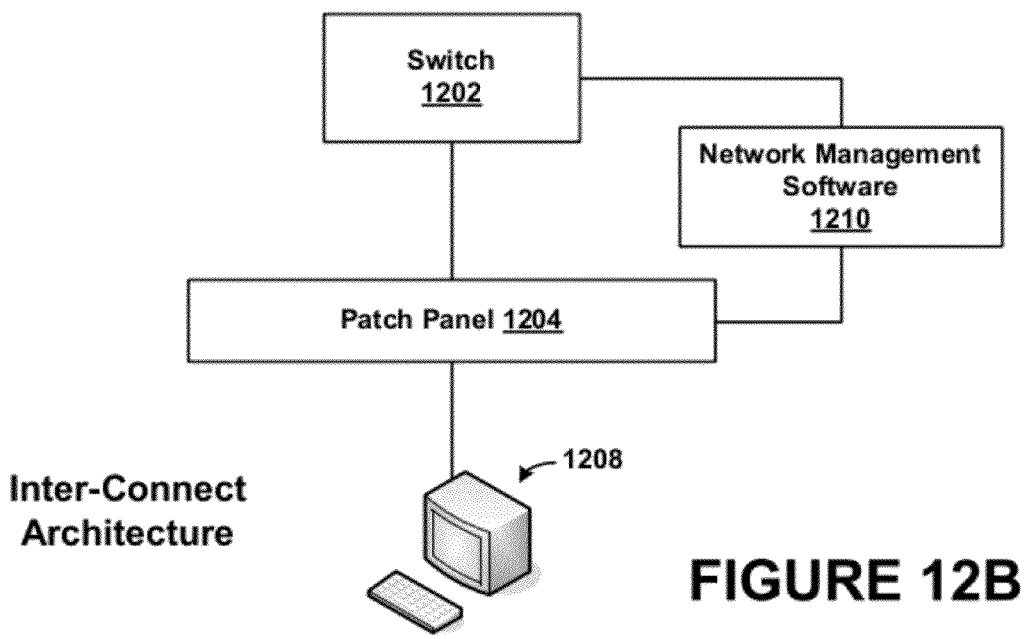
FIG. 12B is an example block diagram illustrating an interconnect network architecture.

FIG. 12B is an example block diagram illustrating an interconnect architecture, which is a configuration including the switch 1202 coupled to the end computer 1208 through one panel 1204. Each of the switch 1202 and the patch panel 1204 communicate through network management software 1210. As with the cross-connect architecture, for purposes of the present description, the panels 1204 are also provided with "intelligence" in the form of circuitry.

Figure 13:
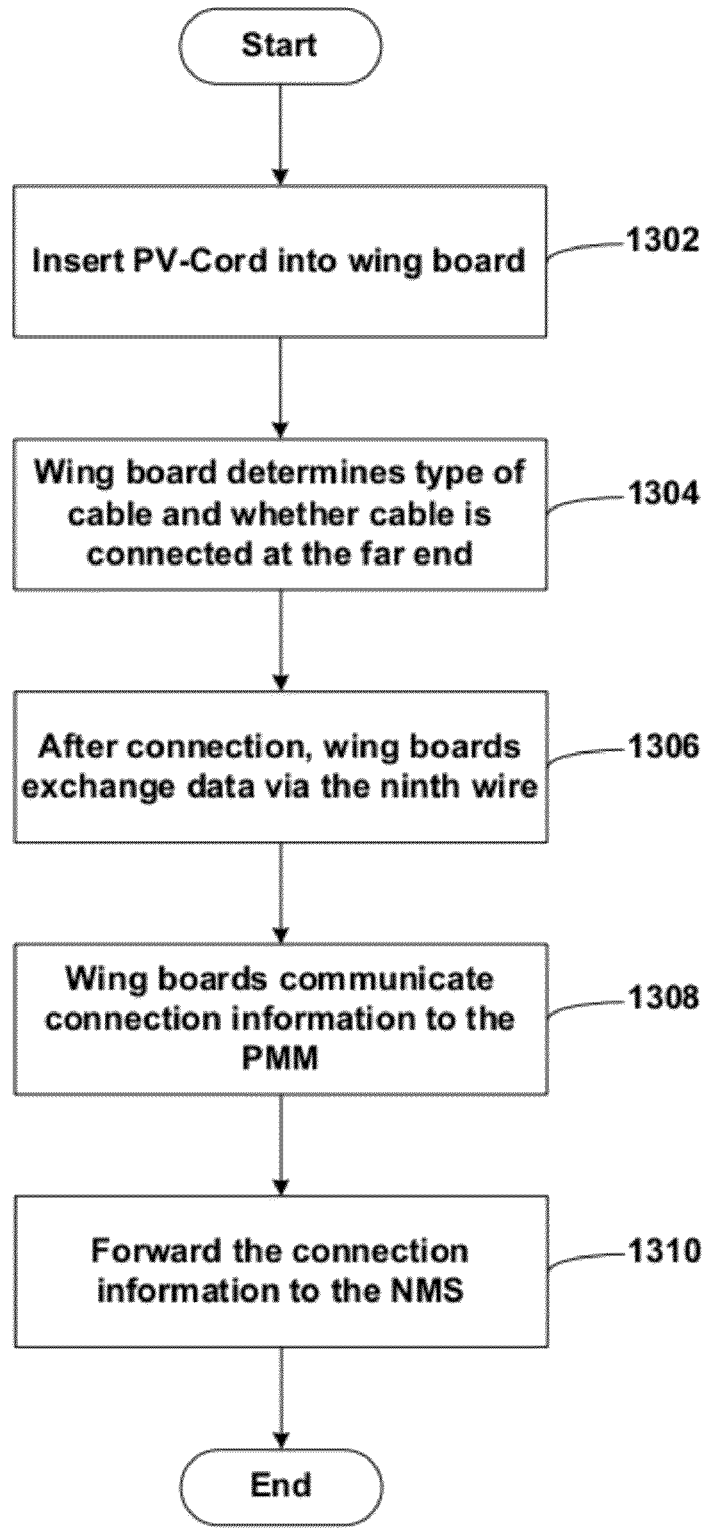
FIG. 13 is a flowchart depicting functional steps of an example method for performing patching between patch panels in a cross-connect type architecture.

Generally, in a cross-connect type architecture, the system will use the combination of a nine-wire patch cord and custom electronics in the wing boards to detect point-to-point patches. FIG. 13 is a flowchart depicting functional steps of an example method for performing patching between patch panels in a cross-connect type architecture. It should be understood that each block in this flowchart (and within other flow diagrams presented herein) may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Initially, when a nine-wire patch cord is inserted into a patch panel port, the ninth wire of the nine-wire patch cord will make an electrical connect with the contacts on the wing board, as shown at block 1302. The wing board electronics can determine both the type of cable (nine-wire patch cord or ten-wire patch cord), and whether the cord is plugged into a patch panel at the other end (far end), as shown at block 1304. When both ends of a nine-wire patch cord are in patch panel ports, the wing boards will initiate communications and exchange data via the ninth wire, as shown at block 1306. The wing boards will exchange a panel ID and port information, and then the wing boards on the patch panels connected by the patch cord will communicate the connection status along with the ID information to the PMM, as shown at block 1308. If the system includes an NMS, the PMM will forward the connection information to the NMS for display and storage. Many different types of communication protocols may be used by the PMM, wing boards and patch cords to transfer data among the components. Some example protocols are discussed below.

Using the cross-connect type architecture, the technician makes the connections as desired between patch panels with the nine-wire patch cord, and once the connections are completed, the wing boards send connection information to the PMM, which forwards the information to the NMS for display and storage.

Similar steps are performed to create a connection within an interconnect system architecture between a patch panel and an Ethernet switch or Ethernet router. In one example, a sequence of steps can be completed that are referred to as I-Cord provisioning. The PMM that is inserted into the patch panel will act as the intelligence to learn from a patch cord both the cord's unique ID and connection status, and will subsequently instruct the intelligent device built into the patch cord to light an LED at the far end of the cable to help the technician identify the correct cable.

Generally, a user first plugs a ten-wire patch cord into the provisioning port of the PMM. Next, the technician plugs the far end of the ten-wire patch cord into an Ethernet switch port or Ethernet router port, and finally moves the near end of the ten-wire patch cord from the provisioning port to the correct or desired patch panel port. The PMM will communicate via the 9th and 10th wire of the ten-wire patch cord to an intelligent device embedded in the ten-wire patch cord. From the ten-wire patch cord, the PMM will learn both the ten-wire patch cord's unique ID and the connection status (e.g., whether the far end of the ten-wire patch cord is coupled to a switch). The PMM can also instruct the intelligent device built into the ten-wire patch cord to light an LED at the far end of the cable to help a user identify the correct cable.

Figure 14:
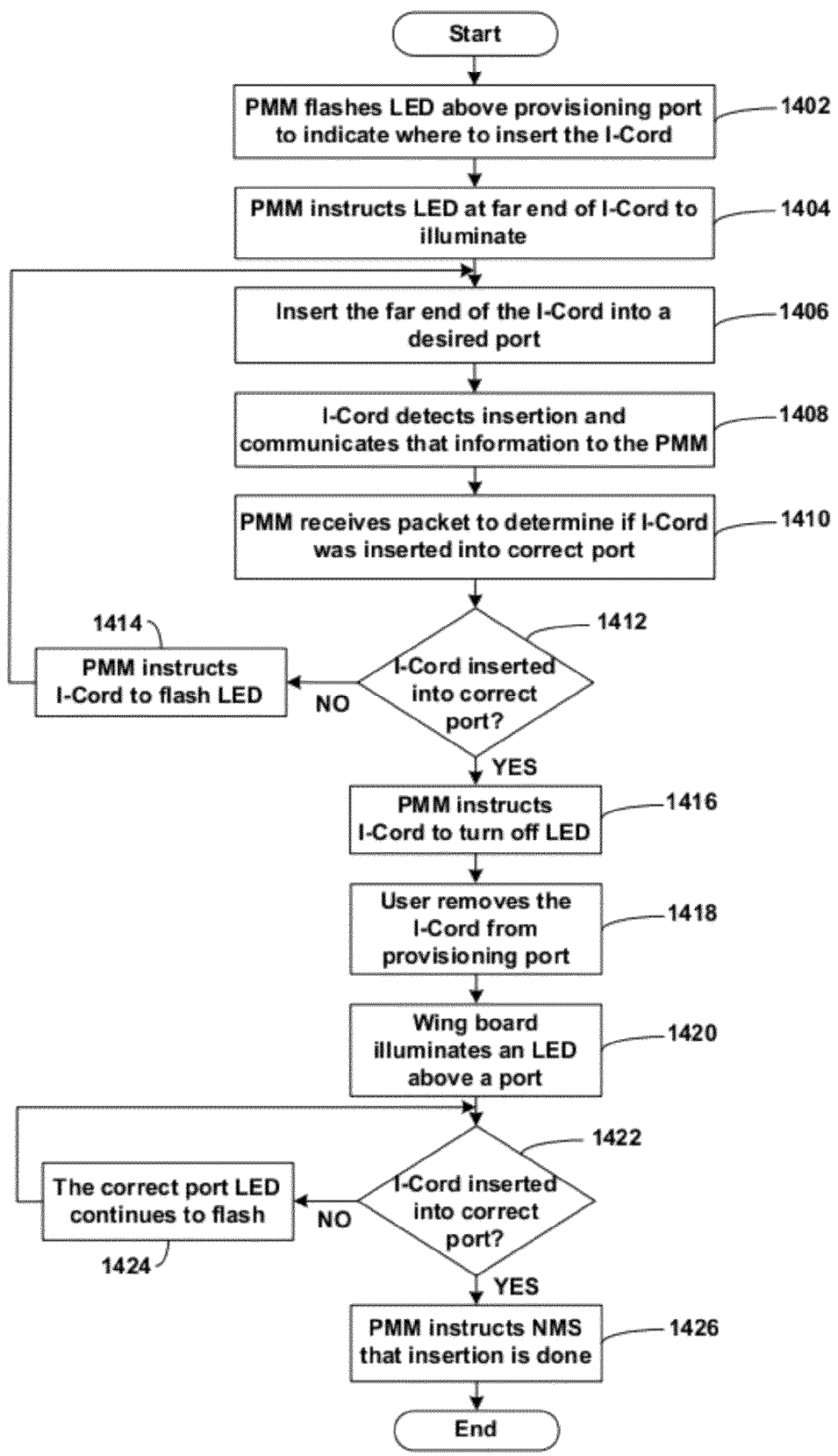
FIG. 14 is a flowchart depicting functional steps of an example method for performing patching between patch panels in an interconnect type architecture in a guided patching case.

FIG. 14 is a flowchart depicting functional steps of an example method for performing patching in an interconnect type architecture in a guided patching case. After initiating the guiding patching mode, a PMM will flash the LED above the provisioning port to indicate to the user where to insert the ten-wire patch cord, as shown at block 1402. The user plugs the ten-wire patch cord into the provisioning port, and the PMM will establish communication with the intelligent device in the ten-wire patch cord at the far end (i.e., the end that is plugged into the PMM is the near end). The PMM will instruct the intelligent device within the cable to illuminate the far end LED to indicate that some action is required from the user (e.g., by flashing the LED), as shown at block 1404.

If the system includes an NMS, the PMM will send a simple network management protocol (SNMP) TRAP message to the NMS software indicating that a ten-wire patch cord was in the PMM provisioning port.

The user will then insert the far end of the ten-wire patch cord into a desired Ethernet switch port or Ethernet router port, as shown at block 1406. The intelligent device embedded in the ten-wire patch cord will detect insertion (for example, via the corresponding depression of a plunger-style switch) and communicate that information via the 9th and 10th wire to the PMM, as shown at block 1408. The PMM then begins to look for a CDP (Cisco Detection Protocol) or LLDP (Link Layer Discovery Protocol) packet from the patch panel, as shown at block 1410 and will use this packet to determine if the user has correctly inserted the ten-wire patch cord into the correct Ethernet switch port or Ethernet Router switch port, as shown at block 1412.

CDP is used to obtain protocol addresses of neighboring devices and discover the platform of those devices. CDP can also be used to show information about the interfaces that a router uses. Similarly, the LLDP is a vendor-neutral Layer 2 protocol that allows a network device to advertise the device's identity and capabilities on the local network. The LLDP protocol is fully explained within IEEE standard 802.1AB-2005, the contents of which are incorporated herein by reference. A CDP or LLDP packet will inform the PMM of the port address or location at which the ten-wire patch cord has been plugged, and the PMM can then determine if the I-Cord has been inserted into the correct port. Of course, other protocols could be used as well depending on the source of the data or type of patch cord being used, for example.

The technician can inform the PMM of a port where the ten-wire patch cord should be inserted using the provisioning or user interface port on the patch panel system, and the PMM compares this information with the information received within the CDP or LLDP packet to determine if the ten-wire patch cord has been inserted into the proper port. A technician may be working with a panel of ports containing possibly hundreds or thousands of ports, and so identifying the correct port can be difficult. Thus, the PMM can help the technician by determining if the ten-wire patch cord has been plugged into the correct port.

If the PMM determines that the user has inserted the cable into a wrong Ethernet switch or Ethernet switch port as indicated by data within the CDP or LLDP message, the PMM will instruct the ten-wire patch cord to flash the LED to indicate to the user that further action is required, as shown at block 1414. For as long as the ten-wire patch cord remains in the incorrect Ethernet switch port, the I-Cord will continue to flash the LED. Once the ten-wire patch cord is removed and re-inserted, the steps above will be repeated.

Once the user has inserted the far end of the ten-wire patch cord in the correct Ethernet switch and port on the switch, the PMM will communicate to the intelligent device in the ten-wire patch cord and instruct the ten-wire patch cord to turn off the LED in the ten-wire patch cord, as shown at block 1416. The PMM will also begin to flash an LED atop the provisioning port to draw the attention of the user and the user will then need to remove the ten-wire patch cord from the provisioning port on the PMM, as shown at block 1418.

Once the user has removed the ten-wire patch cord from the provisioning port, the PMM will stop illuminating the LED above the provisioning port and will instruct the wing board to illuminate an LED above a patch panel port, as shown at block 1420. The PMM detects whether the user has inserted the ten-wire patch cord into the correct port, as shown at block 1422. If the user has inserted the cable into the wrong wing board port, the PMM will send an "unexpected ten-wire patch cord detected" message to the NMS. For as long as the ten-wire patch cord remains in the incorrect port, the port LED will continue to flash indicating an error and that further user action is required, as shown at block 1424. When the user removes the cable from the wrong port, the PMM will instruct the wing board to turn off the LED indication on the wrong port.

According to one embodiment, a time limit can be imposed on steps within the process, after which the process must be terminated or restarted. For example, a user may be given a specific period of time in which to perform the insertion of a plug of an I-Cord into a correct port (as detected at block 1422) after the I-Cord was removed from the provisioning port (as shown at block 1418).

The above process will repeat until the user has correctly plugged in the ten-wire patch cord. Once the ten-wire patch cord is in the correct patch panel port, the wing board will communicate this information to the PMM and the PMM will send a message to the NMS indicating that the insertion has been completed successfully, as shown at block 1426. The PMM will also indicate to the local user that the action has been completed successfully.

The patch panel system of the present application provides almost-instant or real-time visibility to service disruptions (such as accidental disconnections) and accidental service activation (i.e., the unintentional creation of a connection) via real-time active monitoring of all patch field connections. As a target, the time between an occurrence of such an event and visibility of that event at a management terminal may not exceed three seconds, for example.

The patch panel system of the present application guides the user in adding, moving, or removing patch cords from a patch field to reduce human error in implementing changes in a patch field. The custom patch cords (nine-wire patch cord and ten-wire patch cord) enable real-time monitoring of connectivity to provide near-instant feedback of a correctly (or incorrectly) completed MAC. Multi-color LEDs on the patch panel provide visual indications on how to execute a work order or command, as well as how to correct the insertion or deletion, if completed incorrectly.

In addition, the patch panel system of the present application supports multiple configurations of cross-connect and interconnect topologies. In the cross-connect topology, all patch panels have PMMs or PEMMs installed and nine-wire patch cords provide connectivity between the patch panels within the system. In the interconnect topology, all patch panels have PMMs or PEMMs installed and ten-wire patch cords provide connectivity between patch panels and Ethernet Switches or Ethernet routers.

The use of expansion ports on the PMMs supports the possible addition of future devices such as thermal, environmental, and power monitoring and management hardware. Additionally, the removable modular PMM enables field update capability because a user will be able to insert and remove the PMM from the system to upgrade the system without the need to change out a patch panel.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be apparent to those of ordinary skill in the art that the methods described herein may be embodied in a computer program product that includes one or more computer readable media, as described as being present within the PMM or PEMM. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals. The form of the computer-readable medium of instructions can be provided in a variety of forms, and the present application applies equally regardless of the particular type of signal bearing media used to actually carry out the distribution.

The principles of the present application may be applied to other specific systems as well. For example, patch cords and patch panel ports according to other embodiments of the present application and that are designed for use in optical communication networks or in other electrical communication networks that do not employ RJ-45 plugs and jacks can be used as well. In addition, the use of the terms "nine-wire patch cord" and "ten-wire patch cord" in the present application apply to a traditional eight-wire RJ-45 connection. Thus, a "nine-wire patch cord" refers to any patch cord having one extra wire used for connectivity management purposes or other purposes as described herein. Likewise, a "ten-wire patch cord" refers to any patch cord having two extra wires used for the purposes described herein.

It is intended that the foregoing detailed description be regarded as illustrative rather than limiting, and it is intended to be understood that the following claims including all equivalents define the scope of the invention.

The invention claimed is:

1. A communications patch panel comprising:
a plurality of patch panel ports provided on a face of the patch panel, each of said plurality of patch panel ports having at least one associated management contact;
at least one wing board containing circuitry associated with at least some of said plurality of patch panel ports, said circuitry of said wing board interfacing with said management contacts of said patch panel ports;
a panel management module removably attached to said patch panel, said panel management module interfacing with said at least one wing board when connected to said patch panel and comprising control circuitry that can transmit and receive signals to and from said management contacts; and
a user interface that is accessible at said face of said patch panel, said user interface interfacing with said panel management module whereby functions of said panel management module may be accessed by a user.

2. The communications patch panel of claim 1 wherein said user interface comprises a plurality of buttons and a plurality of indicator lights.

3. The communications patch panel of claim 1 wherein said panel management module comprises at least one card edge connector through which said panel management module interfaces with said at least one wing board.

4. The communications patch panel of claim 1 wherein said panel management module further comprises two power ports, whereby multiple panel management modules associated with multiple communications patch panels can be daisy chained for power sharing.

5. The communications patch panel of claim 1 wherein said panel management module further comprises two Ethernet ports for daisy chaining management data connectivity between panel management modules of multiple communications patch panels.

6. The communications patch panel of claim 1 further comprising a provisioning port accessible at said face of said patch panel and interfacing with said panel management module to provide provisioning functions during patch cord insertion and removal processes.

7. A communications patch cord management system comprising:
- a first communications patch panel comprising:
- a plurality of first patch panel ports provided on a face of the first patch panel, each of said plurality of patch panel ports having at least one associated management contact;
- at least one first patch panel wing board containing circuitry associated with at least some of said plurality of first patch panel ports, said circuitry of said wing board interfacing with said management contacts of said first patch panel ports; and
- a panel management module removably attached to said first communications patch panel, said panel management module interfacing with said at least one first patch panel wing board when connected to said patch panel and comprising control circuitry that can transmit and receive signals to and from said management contacts on said first communications patch panel; and
- a second communications patch panel comprising: a plurality of second patch panel ports provided on a face of the second patch panel, each of said plurality of patch panel ports having at least one associated management contact;
- at least one second patch panel wing board containing circuitry associated with at least some of said plurality of second patch panel ports, said circuitry of said wing board interfacing with said management contacts of said second patch panel ports; and
- a peripheral expansion management module removably attached to said second communications patch panel, said peripheral expansion management module interfacing with said panel management module whereby said management contacts on said second communications patch panel can be accessed and controlled in conjunction with signals sent between said peripheral expansion management module and said panel management module.

8. The communications patch cord management system of claim 7 wherein said panel management module and said peripheral expansion management module are connected via an RS485 connection.

9. The communications patch cord management system of claim 7 wherein said peripheral expansion management module is provided with two ports whereby multiple peripheral expansion management modules may be daisy chained for connection to said panel management module.

10. The communications patch cord management system of claim 7 further comprising a user interface that is accessible at said face of said first communications patch panel, said user interface interfacing with said panel management module whereby functions of said panel management module may be accessed by a user.

11. The communications patch cord management system of claim 7 wherein said peripheral expansion management module is provided with two power ports, whereby said peripheral expansion management module may accept power from said panel management module and forward power on to other peripheral expansion management modules in a daisy chain configuration.

* * * * *